United States Patent
Wahlström et al.

(10) Patent No.: US 8,595,713 B2
(45) Date of Patent: Nov. 26, 2013

(54) RADIO BASE STATION AND A METHOD OF OPERATING A RADIO BASE STATION

(75) Inventors: Peter Wahlström, Bromma (SE);
Per-Erik Sundvisson, Stockholm (SE);
Tomas Lagerqvist, Stockholm (SE)

(73) Assignee: Andrew LLC, Hickory, NC (US)

( * ) Notice: Subject to any disclaimer, the term of this patent is extended or adjusted under 35 U.S.C. 154(b) by 1032 days.

(21) Appl. No.: 11/571,658

(22) PCT Filed: Jun. 21, 2005

(86) PCT No.: PCT/SE2005/000965
§ 371 (c)(1),
(2), (4) Date: Aug. 25, 2008

(87) PCT Pub. No.: WO2006/006908
PCT Pub. Date: Jan. 19, 2006

(65) Prior Publication Data
US 2008/0320464 A1    Dec. 25, 2008

(30) Foreign Application Priority Data

Jul. 8, 2004  (SE) ...................................... 0401798

(51) Int. Cl.
*G06F 9/44*     (2006.01)
*G06F 17/30*    (2006.01)
*G06F 9/24*     (2006.01)

(52) U.S. Cl.
USPC ........... 717/168; 717/167; 717/169; 717/170; 707/640; 707/679; 707/674; 707/684

(58) Field of Classification Search
USPC .......... 717/173, 167–170; 707/200, 202, 203, 707/640, 679, 674, 684; 713/1, 200; 455/561
See application file for complete search history.

(56) References Cited

U.S. PATENT DOCUMENTS

| | | | |
|---|---|---|---|
| 5,715,462 A | 2/1998 | Iwamoto et al. | |
| 5,778,187 A | 7/1998 | Monteiro et al. | |
| 6,324,411 B1 | 11/2001 | Genell | |
| 6,378,069 B1 * | 4/2002 | Sandler et al. | 713/153 |
| 2001/0049263 A1 * | 12/2001 | Zhang | 455/67.1 |
| 2002/0086688 A1 | 7/2002 | Kang | |
| 2002/0181405 A1 * | 12/2002 | Ying | 370/245 |
| 2003/0005037 A1 * | 1/2003 | Aija et al. | 709/203 |
| 2003/0092438 A1 | 5/2003 | Moore et al. | |
| 2003/0093688 A1 * | 5/2003 | Helgesen et al. | 713/200 |

(Continued)

FOREIGN PATENT DOCUMENTS

| | | |
|---|---|---|
| CN | 1439128 | 8/2003 |
| CN | 1506822 | 6/2004 |

(Continued)

*Primary Examiner* — Tuan A Vu
*Assistant Examiner* — Lynda Dinh
(74) *Attorney, Agent, or Firm* — Mendelsohn, Drucker & Dunleavy, P.C.; Steve Mendelsohn

(57) ABSTRACT

The present invention relates to the operation and maintenance of radio base stations in mobile communication systems. An inventive radio base station, which can be upgraded remotely in a safe way. In one embodiment of the invention, the radio base station comprises a file system comprising different versions of files, so that an old version of a file can be reverted to should problems in the operation of the radio base station occur. In another embodiment of the invention, the radio base station comprises a back-up area in which a copy of the files of the file system are stored. The back-up area is independent of the file system, so that if problems with the files in the file system are detected, the contents of the back-up area can be stored in the file system.

20 Claims, 6 Drawing Sheets

(56) References Cited

U.S. PATENT DOCUMENTS

2004/0073582 A1 4/2004 Spiegel
2004/0103340 A1* 5/2004 Sundareson et al. ............. 714/6
2004/0117785 A1* 6/2004 Kincaid ...................... 717/170
2005/0166199 A1* 7/2005 Willis .......................... 717/173

FOREIGN PATENT DOCUMENTS

| EP | 0687975 A1 | 6/1995 |
| JP | 07-255080 | 10/1995 |
| JP | 10-105407 | 4/1998 |
| JP | 2001-014238 | 1/2001 |

* cited by examiner

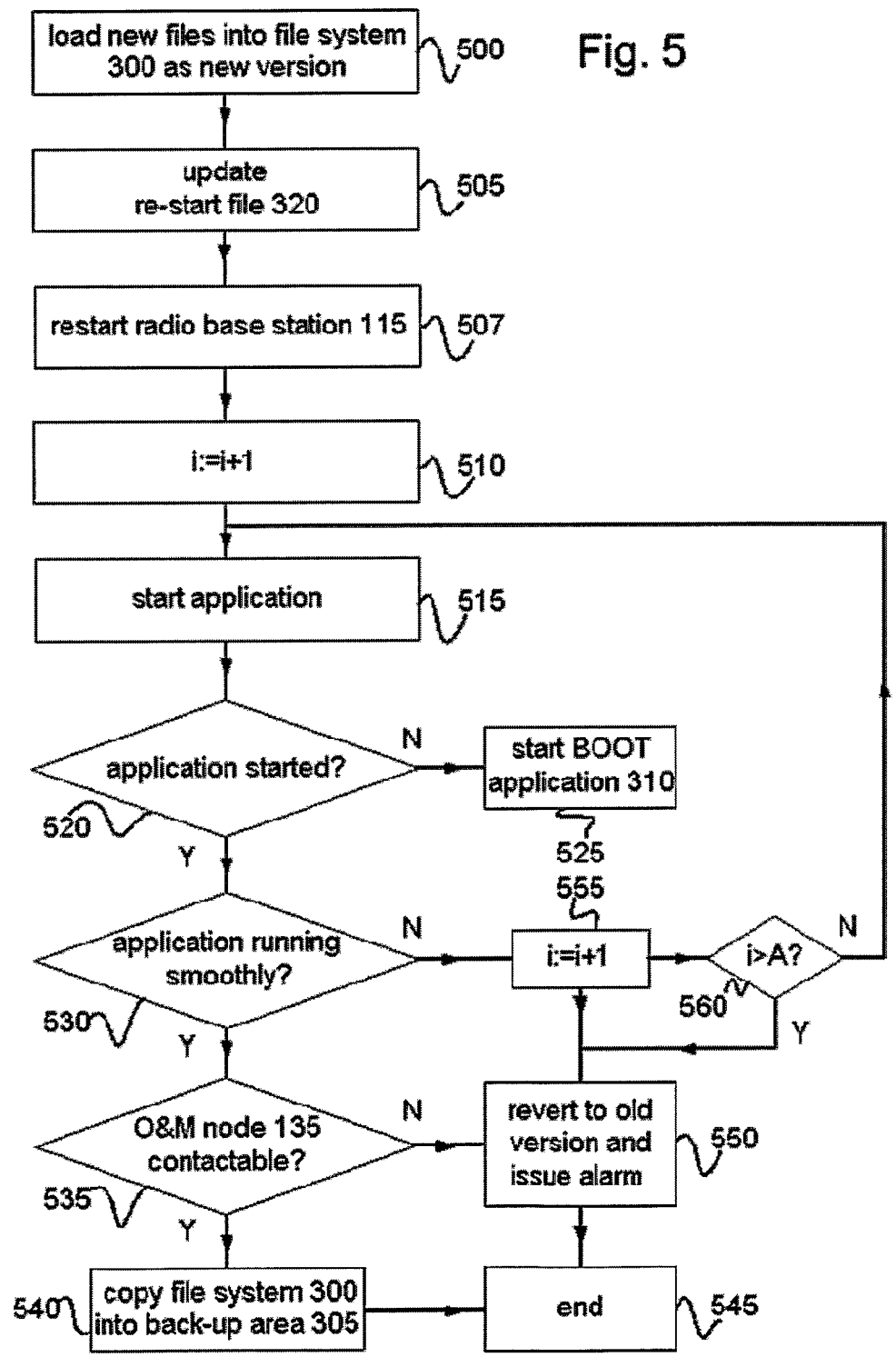

RADIO BASE STATION AND A METHOD OF OPERATING A RADIO BASE STATION

FIELD OF THE INVENTION

The present invention relates to the field of the operation and maintenance of radio base stations in mobile communication systems.

BACKGROUND

Many computer based technical systems have parts which are located at different geographical places. One example of such a distributed computer based system is a mobile communications network, which may cover a very large area and have technical equipment in a large number of places located very far apart. Typically, a mobile communications network covers an entire country, and comprises technical equipment which is located at several thousands of locations within the country.

SUMMARY

A problem to which the present invention relates is how to minimise the number of visits to radio base station sites required in the operation of a mobile radio network.

In a first embodiment of the invention, the problem is addressed by a radio base station for transmitting and receiving radio signals in a mobile radio network, the radio base station having an interface towards an operations and maintenance node, the radio base station comprising:
- a non-volatile memory comprising a file system for storage of files relating to the operation of the radio base station, wherein
- the file system comprises at least two versions of at least one file, out of which one version is the active version to be used in the operation of the radio base station;
- the radio base station comprises an indication as to which of said at least two versions is the active version; and
- the radio base station comprises means for reverting to using a previous version of said at least one file in the operation of the radio base station.

In the first embodiment of the invention, the problem is further addressed by a method of upgrading a file in a radio base station, the file being a data file or an executable file, the radio base station having an interface towards an operations and maintenance node, the radio base station comprising a non-volatile, writable memory comprising a file system in which the file to be upgraded is stored, the method comprising:
- receiving, in the radio base station over the interface, a new version of the file;
- storing the new version of the file in the file system while keeping a previous version of the file;
- keeping an indication in the radio base station as to which version of the file-to-be-upgraded is the active version to be used in the operation of the radio base station; and
- arranging so that said indication indicates that the new version of the file-to-be-upgraded is the active version.

By the inventive radio base station and method according to the first embodiment is achieved that, upon upgrading of the files in a radio base station, the previously used versions of the files to be upgraded are kept in the file system and can be reverted to should any problem occur during the upgrading procedure. Hence, the upgrading can be performed remotely in a safe way, and the number of site visits can be reduced.

In a second embodiment of the invention, the problem is addressed by a second embodiment of a radio base station for transmitting and receiving radio signals in a mobile radio network, the radio base station having an interface towards an operation and maintenance node, the radio base station comprising:
- a non-volatile memory comprising a file system for storage of files relating to the operation of the radio base station, and
- a non-volatile memory comprising a back-up area for back-up storage of files of the file system, wherein the back-up area is separate from the file system.

In the second embodiment, the problem is further addressed by a method of operating a radio base station having files stored in a file system in a non-volatile, writeable memory, the method comprising
- storing, in a back-up area of a non-volatile memory, a back-up copy of said file system, wherein the back-up area is independent of said file system; and
- copying, upon detection of problems with the file system, the contents of the back-up area into the file system.

By the inventive radio base station and method according to the second embodiment is achieved that a copy of the files in the file system is stored independently of the file system Hence, if a problem occurs during the upgrading or operation of the radio base station, the copy of the files stored in the back-up area can be automatically copied into the file system. Thus, the upgrading can be performed remotely in a safe way. Furthermore, problems causes by errors introduced to the file system can be solved automatically. Hence, the number of site visits can be reduced.

In a third embodiment of the invention, the problem is addressed by a radio base station for transmitting and receiving radio signals in a mobile radio network, the radio base station having an interface towards an operation and maintenance node, the radio base station comprising:
- a platform part and an application part, the platform part and the application part interacting via an internal interface of which different versions exist;
- the platform part comprises a data file comprising first information on which versions of said internal interface are supported by the platform part; and
- the application part comprises a data file comprising second information on which versions of said internal interface are supported by the application part.

In the third embodiment of the invention, the problem is further address by a of operating a radio base station, the radio base station having a platform part and an application part communicating via an internal interface existing in different versions, the radio base station further having an interface towards an operation and maintenance node, the method comprising:
- storing, in the radio base station, a first list of which versions of the internal interface are supported by the platform part;
- storing, in the radio base station, a second list of which versions of the internal interface are supported by the application part;
- comparing, upon upgrading of the platform part or the application part with a new version of the platform part or the application part, the contents of list of the part of the radio base station that is not being upgraded with the versions of the internal interface supported by the new version of the part of the radio base station which is being upgraded; and
- selecting, to be used in the operation of the radio base station, a version being supported by both the part of radio base station which is being upgraded and the part of radio base station which is not being upgraded.

By the third embodiment of the invention is achieved that upgrading of the platform part or the application part of the radio base station can be safely performed without risking that a new version of the platform/application part cannot communicate with the already existing application part/platform part. Hence, upgrading of the radio base station can be safely performed, and the number of site visits can be reduced. Furthermore, compatibility between previous and future versions of the platform part and the application part can be assured.

The characteristics of three embodiments of the invention can advantageously be combined, in order to obtain a radio base station which provides excellent safety when it comes to upgrading of software and hardware of the radio base station.

In one aspect of the invention, the radio base station comprises data storage on which is stored a file comprising said indication, said indication comprising information regarding where in the file system the active version of the at least one file is stored; and the radio base station is arranged to update said file comprising information when a new version of a said at least one file is included in said file system, the updating being performed in a way so that the information indicates that the new version is the active version.

In this aspect, the arranging of the inventive method comprises updating said file comprising information upon storing said new version, the updating being performed in a way so that the information indicates that the new version is the active version. In this aspect, the inventive method may advantageously further comprise indicating, if the operation of the radio base station is disturbed when the new version of the file to be upgraded is used in the operation of the radio base station, in the file comprising information, that the previous version of the file-to-be-upgraded is the active version of the file-to-be-upgraded.

In another aspect of the invention, the radio base station comprises data storage on which is stored a file comprising said indication, said indication comprising information regarding where in the file system the active version of the at least one file is stored; and the radio base station is arranged to, upon updating of said at least one file, store the version of said at least one file which has previously been used as the active version as a version which should be used upon reverting to a previous version, and said radio base station is further arranged to store a new version of said at least one file so that said indication in said file comprising said indication indicates that said new version is the version to be used in the operation of the radio base station.

In this another aspect of the invention, the arranging of the inventive method comprises storing, upon upgrading the file-to-be-upgraded, the version of said file-to-be-upgraded which has previously been used as the active version as a version which should be used upon reverting to a previous version; and storing the new version of said file-to-be-upgraded so that said indication in said file comprising said indication indicates that said new version is the version to be used in the operation of the radio base station.

By the above mentioned one and another aspects of the invention is achieved that instability of the operation of the radio base station caused by errors in newly upgraded files can be solved by reverting to a previous version of the file causing the problems.

In one aspect of the invention, wherein the radio base station comprises a non-volatile, writeable memory comprising a back-up area for the back-up storage of files in the file system, the back-up area being separate from the file system, the inventive method further comprises storing, if the operation of the radio base station is not disturbed when a new version of a file to be upgraded is used, the new version of the file to be upgraded in the back-up area. In this aspect, the contents of the back-up area is advantageously copied into the file system if the radio base station cannot operate.

By this aspect is achieved that the files stored in the back-up area are up to date.

In another aspect of the invention, data relating to a specific information category is stored, in the file system, in a data file of a file type for data relating to said specific category; and
the radio base station comprises software for upgrading files in the file system comprising computer program code for checking whether the new version of the file to be upgraded is of the same file type as the versions of the file to be upgraded stored in the file system prior to the upgrading.

In this aspect, wherein the new version of the file to be upgraded is of a specific file type, the inventive the method comprises checking whether version(s) of the file to be upgraded, stored in the file system prior to the upgrading, are of the same file type as the new version; and if not, interrupting the upgrading of the file to be upgraded.

By this aspect of the invention is achieved that it can be assured that file categories that should not be altered are not tampered with by mistake. Hence, the reliability of the upgrading procedure is further increased.

In yet another aspect of the invention wherein the radio base station further comprises a boot application;
the file system comprises a file comprising information on which files should be present in the file system;
the boot application is arranged to read the contents of the file comprising information on which files should be present in the file system and compare said information to the files that are actually present; and wherein
the boot application is further arranged to load the contents of the back-up area into the file system if discrepancies are detected between the files that should be present and the files that actually are present in the file system.

In this aspect of the invention, wherein the radio base station further comprise storage for a file comprising information on which files should be present in the file system, the method further comprises;
reading the information on which files should be present in the file system contained in said file comprising information;
comparing said information with the files that are actually present in the file system;
loading the contents of the back-up area into the file system if discrepancies are detected between the files that should be present and the files that actually are present in the file system.

Hereby is achieved that errors in the file system can be automatically detected and remedied.

In another aspect of the inventive radio base station, the files stored in the file system comprises a content indicator indicating whether or not the file to which the content indicator belongs is faulty; the boot application is arranged to check said content indicators upon start-up of the radio base station; and the boot application is further arranged to load contents of the back-up area into the file system if a content indicator is found to indicate that the file to which the content indicator belongs is faulty.

In this aspect, wherein the files stored in the file system comprises a content indicator indicating whether or not the file to which the content indicator belongs is faulty; the method comprises checking said content indicators; and loading contents of the back-up area into the file system if a content indicator is found to indicate that the file to which the content indicator belongs is faulty.

Hereby is achieved that errors in the file system can be automatically detected and remedied.

The inventive methods as described above can preferably be implemented by means of programmable digital circuitry in the radio base station and/or in the operation and maintenance node. The problem to which the invention relates is hence further addressed by computer program products comprising computer program code means operable to, when executed on digital programmable circuitry, execute the methods described above.

BRIEF DESCRIPTION OF THE DRAWINGS

The present invention will now be discussed in more detail with reference to preferred embodiments of the present invention, given only by way of example, and illustrated in the accompanying drawings, in which:

FIG. 5 is a flowchart schematically illustrating an embodiment of the inventive procedure of upgrading files in a file system.

DETAILED DESCRIPTION

Figure 1:
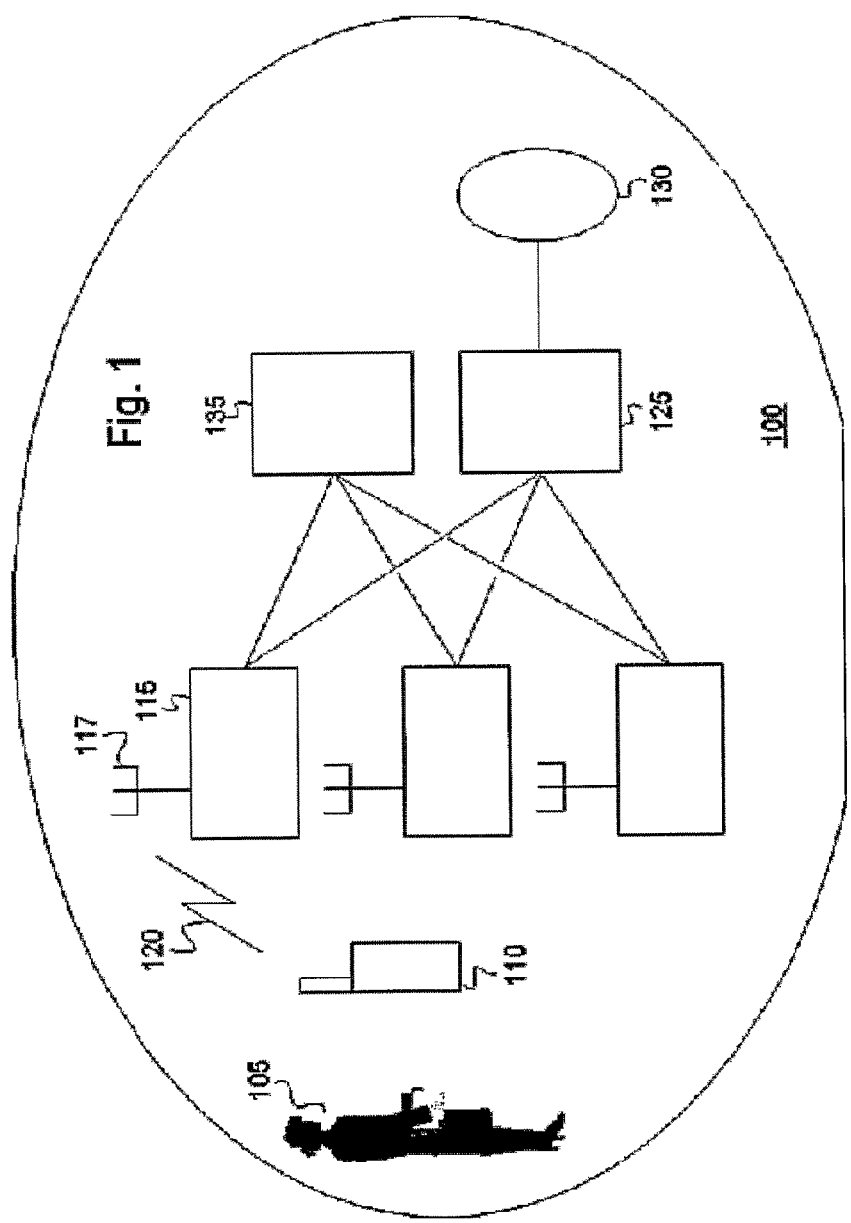
FIG. 1 is a schematic illustration of a mobile radio network.

The general architecture of a mobile radio network 100 is illustrated in FIG. 1. Mobile radio network 100 provides mobile communications to users 105 of mobile equipment 110 via a plurality of radio base stations 115 over a radio interface 120. A radio base station 115 is connected to an antenna 117, and is further connected to a radio network controller 125, which in turn is connected to a core network 130. In a typical mobile radio network 100, there are a plurality of radio network controllers 125, each connected to a plurality of radio base stations 115 located at different locations. The radio base stations 115 of a mobile radio network 100 are preferably located at locations where the radio conditions are good.

In order to ensure radio coverage in the geographical area 140 covered by a mobile radio network 100, many radio base stations 115 are spread out over a vast geographical area.

A radio base station 115 comprises computer software and hardware for performing the tasks of a radio base station 115, such as e.g. receiving instructions from the radio network controller 125, transmitting and receiving signals across the radio interface 120, performing digital filtering of signals received and transmitted over the radio interface 120 etc.

In many instances, it is necessary or advantageous to make alterations to the computer software and hardware of a radio base station 115. This is e.g. the case when all or parts of the computer software of the radio base station 115 need to be upgraded, when a fault in the operation of the radio base station 115 has occurred, or upon installation of a radio base station 115.

In order to minimize the number of site visits to radio base stations 115, it is preferable if such maintenance of the computer software of a radio base station 115 can be maintained remotely, without the need of actually visiting the geographical site of the radio base station 115. The remote maintenance of radio base stations 115 is advantageous in many aspects. For example, by providing the possibility of remote maintenance of the radio base station 115, the time spent travelling between radio base stations 115 can be reduced. Furthermore, since all means of transportation has a negative impact on the environment, the provision of a system for remote maintenance of radio base stations 115 would reduce the environmental impact of mobile radio network 100.

Radio base stations 115 of FIG. 1 are connected to an Operation & Maintenance node (O&M) 135, where the O&M node 135 comprises hardware and software for maintenance of radio base stations 115. In FIG. 1, the connections between O&M node 135 and the radio base stations 115 are shown to be direct connections to each radio base station 115 for purposes of illustration only. In many cases, it is advantageous to physically connect O&M node 135 to radio base stations 115 via radio network controller 125. Communication between O&M node 135 and radio base station 115 could then take place over the interface used by radio network controller 125, which could e.g. be an Asynchronous Transfer Mode (ATM) based protocol. In some instances, such as upon installation of a radio base station 115, it may be desirable to connect a radio base station 115 to a portable O&M node 135. Communication between radio base station 115 and O&M node 135 could then be performed over any protocol, such as e.g. ethernet.

In the following, an inventive radio base station will be described, as well as an inventive method for the maintenance of a radio base station. The description will be made in relation to the operation and maintenance of a radio base station 115, although the invention is also be applicable to any other computer based technical system.

Figure 2:
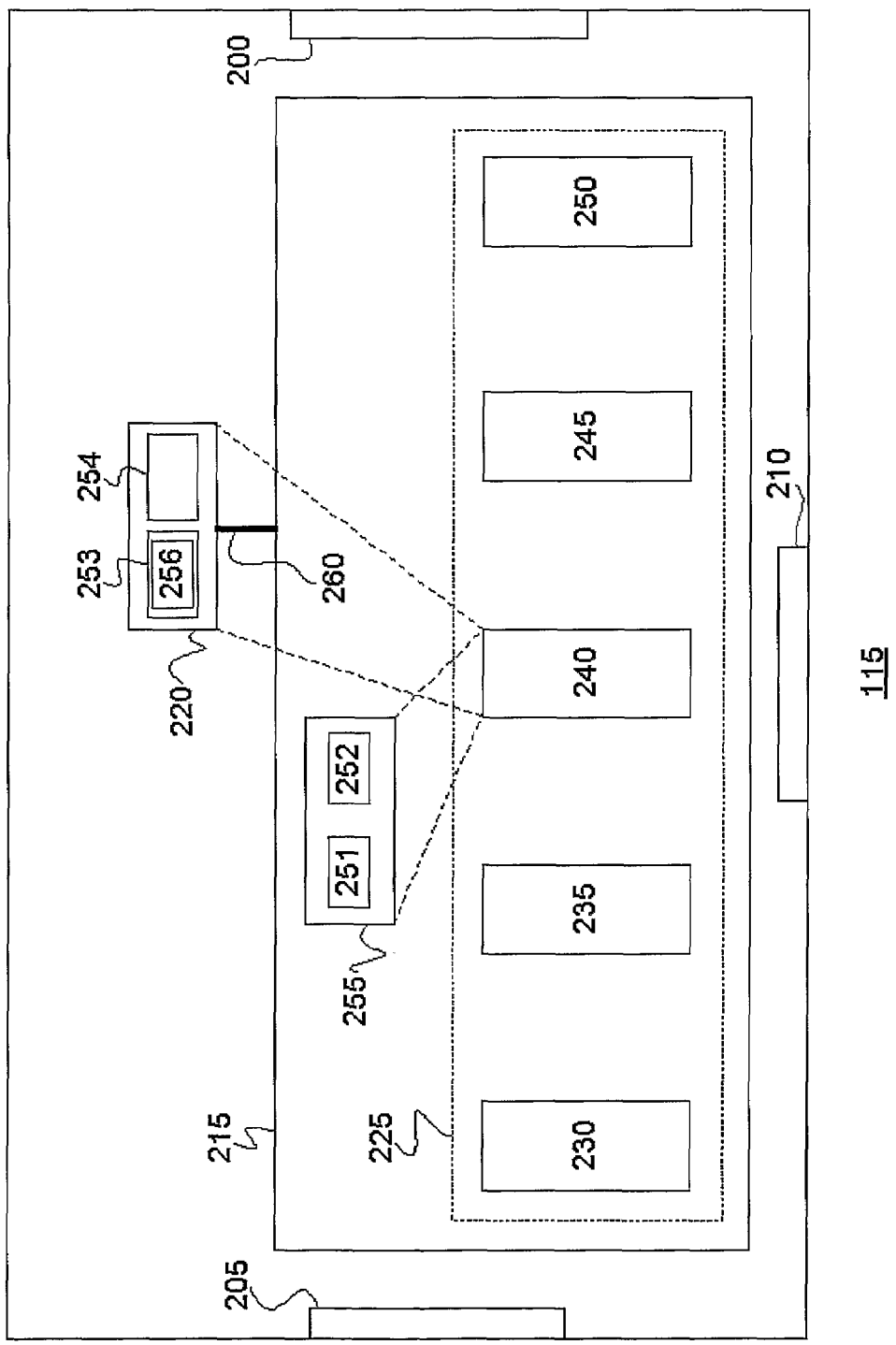
FIG. 2 is a schematic illustration of hardware and software components of a radio base station.

FIG. 2 shows a schematic illustration of an example of a radio base station 115. Radio base station 115 of FIG. 2 has three external logical interfaces: the radio interface 200 between radio base station 115 and the antenna 117, the transmission interface 205 between the radio base station 115 and the radio network controller 125, and the O&M interface 210. Obviously, the transmission interface 205 and the O&M interface 210 can be the same physical interface. Furthermore, O&M interface 210 could comprise more than one physical interface, facilitating for the connection of radio base station 115 to different O&M nodes 135. It may for example be desirable to use a portable O&M node 135 upon initial installation of a radio base station 115, and a central O&M node 135 upon operation of radio base station 115.

Radio base station 115 of FIG. 2 comprises a platform part 215 and an application part 220. The platform part 215 comprises hardware 225, which could e.g. be a transmission circuit board 230, a main control unit 235 comprising a processor, a non-volatile memory 240, a Random Access Memory (RAM) 245, analogue radio circuitry 250, or any other hardware which would be used in the operation of the radio base station 115. Non-volatile memory 240 could be any persistent, writeable memory, such as a flash memory, a hard disk, a mini-disk, a RAM with battery back-up, etc.

The platform part 215 could preferably also comprise platform software 255, i.e. software which is stored in hardware 225 at production of radio base station 115. Platform software 255 could preferably be stored in non-volatile memory 240 of hardware 225 upon production of radio base station 115. Platform software 255 preferably comprises executable files 251 comprising, inter alia, a BOOT application and driver files, as well as data files 252 comprising data regarding characteristics of the hardware 225. Platform software 255 can advantageously be arranged to conceal differences in hardware between individual platform parts 215, so that an application part 220 can be executed on different platform parts 215. Hence, a new platform part 215 having modified hardware 225 can, by introducing suitable platform software 255, be compatible with an old version of application part 220, or a new application part 220 can, in a similar way, be compatible with an old version of the platform part 215.

Application part 220 of radio base station 115 comprises software applications which can be executed on the platform part 215 of radio base station 115: application part 220 preferably comprises application programme files 253 to support the complete traffic operation functionality of the radio base station 115 as well as test functionality. The computer programs of application part 220 used in the normal operation of radio base station 220 will in the following be referred to as the main application 256. Furthermore, application part 220 advantageously comprises data files 254 regarding e.g. site specific information necessary for the operation of radio base station 115. Application part 220 can advantageously be stored in non-volatile memory 240 of FIG. 2. The application programme files 253 and the data files 254 of application part 220 are preferably loadable, and may be upgraded from time to time.

Communication between the application part 220 and the platform part 215 in FIG. 2 is performed over an internal interface 260. Application part 220 preferably acts as a client to the platform part 215. Platform 215 then acts as a server to application part 220.

Figure 3:
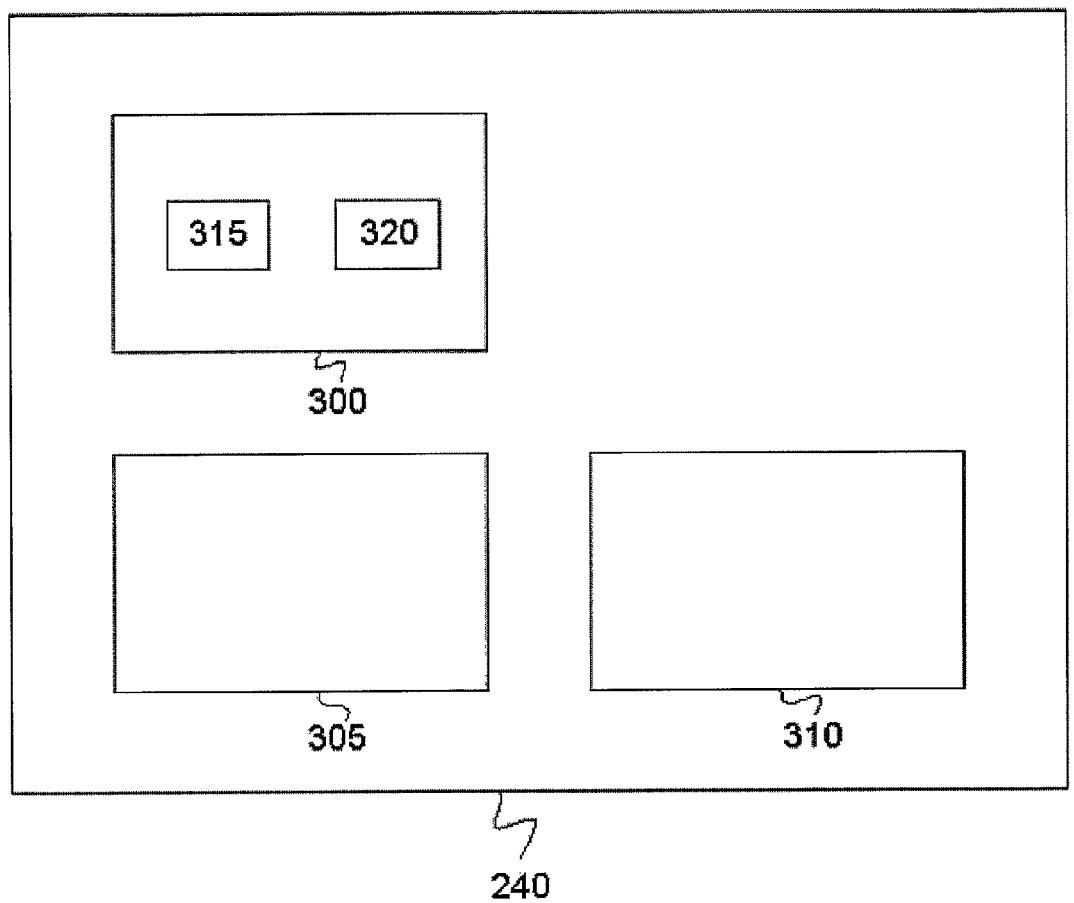
FIG. 3 is a schematic illustration of contents of a non-volatile memory of a radio base station.

FIG. 3 is a schematic illustration of an example of contents of non-volatile memory 240 of radio base station 115. Non-volatile memory 240 of FIG. 3 provides, inter alia, a back-up area 305, storage for a file system 300, and storage for a boot application 310. File system 300 comprises storage for files that are used in the operation of radio base station 115, and will be further described below. Back-up area 305 is preferably not part of file system 300, but provides back-up possibilities which are independent of the file system 300. Hence, files which are necessary for the start-up of radio base station 115 may advantageously be copied and stored in back-up area 305. In order to effectively utilize the back-up area 305 of non-volatile memory 240, files of file system 300 may be stored in back-up area 305 without the use of file system software. An End Of File (EOF) indication could then advantageously be used to indicate the end of each file. Furthermore, the file structure of file system 300 could advantageously be stored in the back-up area 305, in order to facilitate for the retrieval of file system 300 from the back-up area 305. This could e.g. be achieved by storing a file of file system 300 in back-up area 305 using a format comprising the path of the file, the path of the file indicating where in file system 300 the file should be stored upon restoration of the file system 300.

Alternatively, the files of file system 300 are backed-up in back-up area 305 by use of a file system software, so that the back-up area 305 holds a copy of the file system 300.

Although non-volatile memory 240 is illustrated as one physical unit in FIG. 3, non-volatile memory 240 may alternatively be implemented as more than one physical unit.

File System 300

File system 300 preferably comprises data files and executable files which are necessary for the operation of radio base station 115, such as the data files 252 being part of platform software 255, as well as the application programme files 253 and data files 254 being part of the application part 220. In particular, file system 300 preferably comprises a file information file 315 comprising a list of which files should be present in file system 300.

In order to assure that file system 300 will always comprise reliable files that can support the operation of radio base station 300, two or more versions of files could be stored in file system 300. Hence, if file system 300 is updated with new files containing bugs, or otherwise causing problems to the operation of radio base station 115, an older, tested version of the updated file(s) is kept in file system 300 and can be reverted to. File system 300 preferably comprises a re-start file 320, re-start file 320 comprising information about which version of the files in file system 300, existing in more than one version, is the version that should be used in the operation of radio base station 115. In one embodiment of the invention, more than one version is kept of all the files in file system 300. In another embodiment, more than one version is only kept of the files that are crucial for the operation of radio base station 115.

The file information file 315 and the re-start file 320 could obviously be stored outside of file system 300, either as a complement of storing the file information file 315 and the re-start file 320 in file system 300, or as an alternative to the storage in file system 300.

According to the invention, all files in file system 300 could advantageously comprise a content indicator, indicating whether or not the file is intact. This content indicator could be calculated in many different ways, such as via a simple byte addition algorithm adding all the bytes of the file, resulting in e.g. a 32-bit non-saturating number; via a Cyclic Redundancy Check (CRC) calculation; or via any other algorithm generating a number which is indicative of the contents of a file. The content indicator is calculated by the programme that generates a file so that the content indicator can be added to the file upon file generation. The content indicator can, at a later stage, be re-calculated in order to check that the contents of the file has not changed.

The data relating to the operation of radio base station 115 which is stored in file system 300 can advantageously be divided into at least three different categories: product specific data, unit specific data and configuration specific data. The product specific data and unit specific data relate to characteristics of the radio base station 115 known already at production, and can preferably be part of the data files 252 being part of platform software 255. The product specific data relate to properties of radio base station 115 which are the same for all radio base stations 115 produced according to the same specification, and could e.g. comprise information on functionality supported by radio base station 115. The unit specific data relate to properties of the individual radio base station 115, such as calibration data. The configuration specific data, however, relate to information on the configuration of radio base station 115, and are hence not known when the radio base station is produced. The configuration specific data can thus preferably be part of data files 254 of the application part 220. Since the configuration specific data comprises, inter alia, transmission data relating to the communication with other nodes in mobile radio network 100, care has to be taken so that the transmission information is not lost when the configuration specific data is upgraded.

The unit specific data shall not be upgraded, unless the hardware of radio base station to which the unit specific data relates is changed. If the unit specific data are tampered with, the radio base station will most likely have to be returned to the workshop for recalibration. It is therefore important to make sure that the unit specific data can not be altered. The product specific data and the configuration specific data can, on the other hand, preferably be allowed to be upgraded. Such upgrading of the product specific data and configuration specific data can advantageously be performed via an O&M node 135.

In a preferred embodiment of the invention, data files which are administered in different ways are stored as different file types. For example, files which are administered differently can be stored using different suffixes. In this embodiment, the three different data categories mentioned above could be stored using three different file suffixes, such as e.g. .ud for unit specific data files, .pd for product specific data files and .cd for configuration specific data files. Software, stored and executed either in the radio base station 115 or in the operation and maintenance node 135 and which is used in the process of upgrading data files, can advantageously comprise computer program code for checking the suffix of the file(s) to be upgraded, so that file types that are not of the file type to be upgraded are not unintentionally destroyed. In doing so, it can e.g. be assured that the unit specific data files are not destroyed when the configuration specific data files and/or product specific data files of file system 300 are upgraded. For example, it might be desirable to allow the operator of mobile radio network 100 to alter the configuration specific data. In using different suffixes for files containing data which is administered in different ways and by introducing computer program code for checking the suffix of the file(s) to be upgraded into the software for upgrading used by the operator, it can be assured that the operator cannot alter the product specific data files or the unit specific data files. Similarly, software used to upgrade the product specific data files can comprise computer program code for checking that the file(s) to be updated are product specific data files and not of any other file type.

Data files 252 and 254 stored in file system 300 could e.g. be text files, binary files, or any other type of files that allow for the storage and retrieval of data.

The Boot Application 310

The boot application 310 can preferably be stored in non-volatile memory 240 as executable files 251 of platform software 255 upon production of platform part 215. The boot application 310 advantageously comprises computer program code for starting of the main application 256 of application part 220 via the O&M node 135, computer program code for communicating with the O&M node 135, and computer program code for the remote installation of application part 220. The computer program code for communicating with the O&M node 135 preferably comprises computer program code for communicating with a remote O&M node 135 via the radio network controller 120, and computer programme code for communication via a locally connected O&M node 135. The boot application 310 could also comprise initial set-up parameters of platform part 215. The boot application 310 further advantageously comprises computer program code for selecting whether to run the boot application 310 or the main application 256 of application part 220, computer program code for providing fallback operation & maintenance functionality of radio base station 115 such as e.g. computer program code for start/re-start of radio base station 115, and computer program code for installation and upgrading of different functions of radio base station 115. Such fallback O&M functionality can be used if the communication with O&M node 135 for some reason is disturbed.

Figure 4:
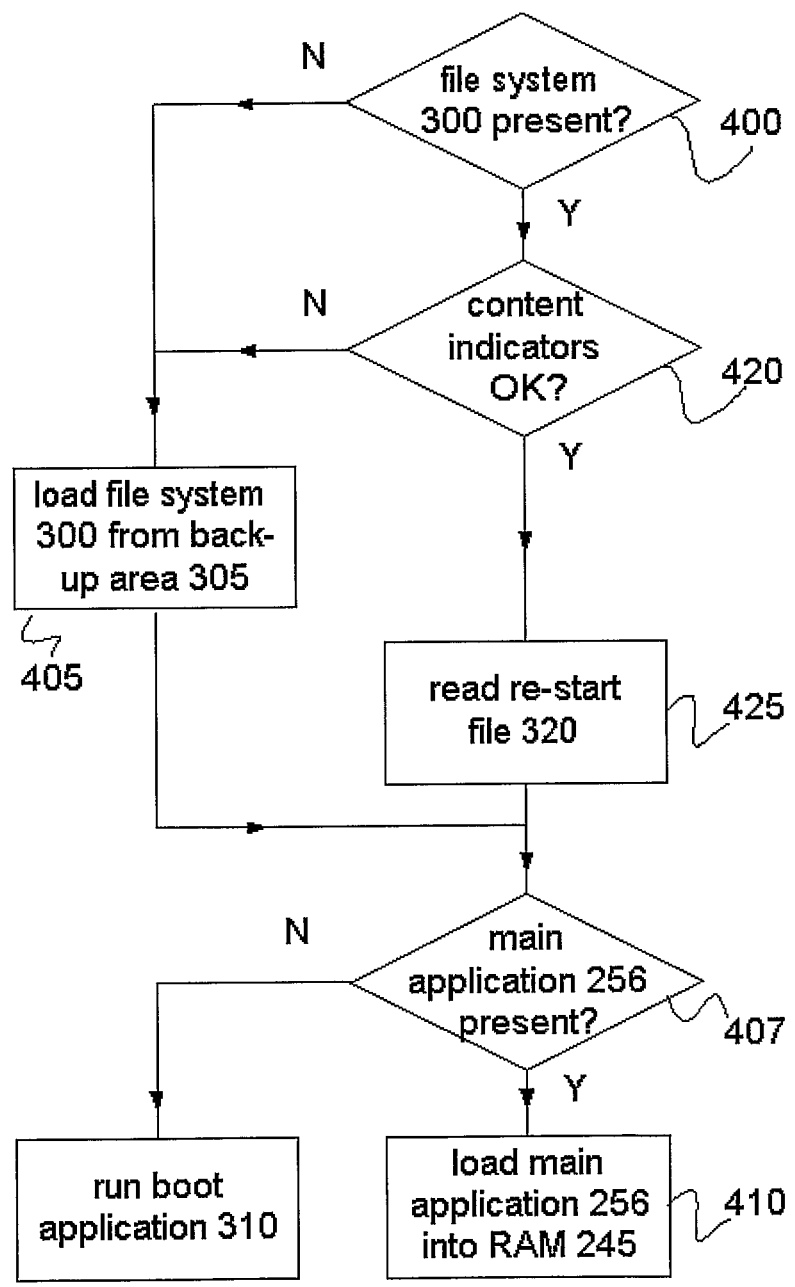
FIG. 4 is a schematic flowchart illustrating a procedure performed by the boot application in one embodiment of the invention.

FIG. 4 is a flowchart schematically illustrating a procedure run by the boot application 310 upon start-up of the radio base station 115. When the radio base station 115 is started, step 400 is entered, in which the boot application 310 checks whether there is a file system 300 present in non-volatile memory 240. This check can preferably comprise a comparison of the contents of file information file 315 and the names of the files in file system 300. If in step 400 discrepancies are found between the contents of file system 300 and the contents of file information file 315, or if no file information file 315 can be found, then step 405 is entered. In step 405, the contents of back-up area 305 are copied into the file system 300. Step 407 is then entered, in which it is checked whether file system 300 comprises a main application 256. If so, step 410 is entered, in which the file containing the main application 256 is loaded into RAM 245. If no main application 256 is present in file system 300, however, the boot application 310 preferably runs procedures for communication with an O&M node 135, the O&M node 135 either being remote or local. Data files 252 of platform software 255 preferably comprises a default address to a remote O&M node 135.

However, if in step 405 it is found that the file names included in the list in file information file 315 coincides with the names of the files present in file system 300, then step 420 is entered. In step 420, the files in file system 300 are checked as to whether a content indicator included in each file is correct or not. If in step 420 it is found that the content indicators of the files in file system 300 are correct, then step 425 is entered, in which the re-start file 320 is read in order to find out which version of files of file system 300 should be used in the operation of radio base station 115. Step 407 is then entered, in which it is checked whether file system 300 comprises a main application 256. If so, step 410 is entered, in which the file containing the main application 256 is loaded into RAM 245. If no main application 256 is present in file system 300, however, the BOOT application 310 preferably runs procedures for communication with an O&M node 135.

However, if in step 420 it is found that a content indicator is not correct, indicating that the file, to which the incorrect content indicator belongs, is faulty, then step 405 is entered, in which the contents of back-up area 305 is copied to into the file system 300. In one embodiment of the invention, only the file(s) of which the content indicator is not correct is replaced by the copy found in back-up area 305. In another embodiment of the invention, the entire file system 300 is replaced by the copy stored in back-up area 305 if a content indicator is found to be incorrect. This latter embodiment is preferable if the files in the back-up area are stored separated by EOF indications. When the copying of files in step 405 is done, step 407 is then entered, in which it is checked whether file system 300 comprises a main application 256. If so, step 410 is entered, in which the file containing the main application 256 is loaded into RAM 245. If no main application 256 is present in file system 300, however, the boot application 310 preferably runs procedures for communication with an O&M node 135.

In an embodiment of the invention in which the files of file system 300 are backed-up in back-up area 305 without the use of file system software, step 405 of FIG. 4, in which the contents of back-up area 305 of non-volatile memory 240 are copied into file system 300, advantageously comprises reading the contents of back-up area 305 and identifying EOF indications. The path of each file, stored as part of the file in back-up area 305, can then be read, and the file system 300 can be restored.

Obviously, the procedure illustrated in FIG. 4 can be varied in many ways. For example, when step 405 has been completed, steps 400 and 420 could be performed in order to assure that the copying of files has been successful. Furthermore, if more than one version of the files of file system 300 are stored in the back-up area 305, it might be necessary to perform step 425 after step 405 has been completed. In some situations, step 410 may be replaced by a different step, in which for example another application, such as a test application, is loaded into RAM 235.

Step 420 of FIG. 4 could be replaced by a comparison, byte by byte or in any other way, between the files stored in the back-up area 305 and the files in file system 300. If the contents of the files stored in file system 300 differ from the contents of the files stored in back-up area 305, the file system 300 would preferably be replaced by the files stored in back-up area 305.

Upgrading of Programs and Data

In many instances, it may be necessary to upgrade some or all of the files stored in file system 300. This can e.g. be the case when new functionality is introduced into the application part 220 of radio base station 115, when errors have been detected in files of file system 300, or when any configuration specific data, such as the IP address or radio characteristics of the surroundings, have altered. Often, it is preferable if such upgrading of files can be performed from a remote O&M node 135. Since the files of file system 300 comprise information necessary for the operation of radio base station 115, unsuccessful upgrading of the files can be disastrous to the radio base station 115 and may require a site visit, or even cause a failure which can only be fixed in a workshop.

According to the invention, the new files, which are to replace the existing files in file system 300 in the upgrading procedure, do not replace the existing files until it is established that the radio base station 115 can operate using the new files. This is achieved by storing two or more independent versions of files in file system 300: the new version and one or several old versions. The re-start file 320 (cf. FIG. 3) comprises information relating to which of the versions of files in file system 300 should be used in the operation of radio base station 115. Such information could e.g. comprise the paths to the version of the files of file system 300 which should be used in the operation of the radio base station 115 (e.g. in the format /non_volatile_memory/application_part/application_part_version_17/application_data.pd), or any other pointer pointing to the version of files in file system 300 which should be used in the operation of radio base station 115. Hence, when the upgrading of file(s) of file system 300 is finished, the re-start file 320 comprises information on how to locate the new version of the upgraded files, and the new version of files in file system 300 will be used in the operation of radio base station 300. However, should problems for some reason occur when using the new files, there is a possibility of reverting to an old version of the files in a rollback procedure. If more than one old version of a file is stored in file system 300, then re-start file 320 could advantageously comprise information on how to locate more than one version of that file and information on which versions should be used in the rollback procedure, as well as information on which version should be used in the operation of the radio base station 115.

A flowchart schematically illustrating an embodiment of the inventive procedure of upgrading files in file system 300 is shown in FIG. 5. In step 500, the new file(s) are loaded into file system 500 as a new version of the file(s) to be upgraded, in a way such that the version of the file(s) to be upgraded that was the newest version, prior to the loading performed in step 500, are still present in file system 300. This can e.g. be performed so that the new file(s) replace the oldest version of the file(s) to be upgraded. Step 505 is then entered, in which the re-start file 320 is updated, so that re-start file 320 indicates that the new version of the file(s) to be upgraded is the version to be used in the operation of radio base station 115. This can e.g. be performed by adjusting pointers/paths in re-start file 320. Step 507 is then entered, in which the radio base station 115 is re-started. The boot application 310 then performs a start-up procedure, e.g. the start-up procedure illustrated in FIG. 4. If, in step 407 of FIG. 4, it is found that a main application 256 is present in the file system 300, then the main application 256 is loaded into the RAM memory 245, and step 510 of FIG. 5 is entered. In step 510 of FIG. 5, a counter i is given the value 1.

In step 515, an application programme that was affected by the loading of new file(s) performed in step 500 is started. This could e.g. be a new application programme stored in a file 253, a new version of an application programme, or an application programme that uses data from a data file 252 or 254 that was upgraded in step 500. In step 520, it is checked whether the application has actually started, or whether a software crash has occurred. This check could e.g. be implemented by means of an error handler or a watchdog. If it is found in step 520 that the application has not started, then step 555 is entered, in which the counter i is incremented. Step 560 is then entered, in which it is checked whether the counter i is greater than a predetermined number A. If not, step 515 is re-entered, in which the application is re-started, and the procedure is continued in step 520 as described above. However, if in step 560 it is found that the counter i has a value larger than the predetermined number A, i.e. the application has had to be re-started a predetermined number of times, then step 550 is entered in which rollback to the previous version of the upgraded file(s) is performed. In step 550, the re-start file 320 is preferably altered, so that the re-start file 320 indicates that the version of the file(s) to be upgraded that was used before the loading in step 500 was performed are the files to be used in the operation of radio base station 115. An alarm is then preferably issued. The procedure is then ended in step 545. Upon re-start of radio base station 115, the re-start file 320 will be read, in which the pointers/paths will indicate that the previous version of the file(s) to be upgraded is the active version. If no previous versions of the file(s) to be upgraded exist in the file system 300, then the boot application will be started (cf. FIG. 4).

If in step 520, however, it is found that the application has started, then step 530 is entered. In step 530, it is checked whether the application programme is running smoothly. This check could e.g. be performed by having a software implemented administration function, to which different parts of the application programme, being responsible for different functions of the radio base station, report whether the start up of the application has been successful or not. Needless to say, if the application programme started only comprises one such part capable of reporting, then no other parts would report to the administration function.

If in step 530 it is found that the application programme is running smoothly, then step 535 is entered, in which it is checked whether the O&M node 135 is contactable. If so, the files of the file system 300 are copied into back-up area 305 in step 540. This copying can either be initialized by the O&M node 135 upon the first contact with the radio base station 115 after the loading of step 500 has taken place, or can be initiated by the application part of radio base station 115 when contact with the O&M node 135 has been detected. The procedure is then ended in step 545. However, if in step 535 it is found that the O&M node 135 is not contactable, then step 550 is entered, in which rollback to the previous version of the upgraded file(s) is performed in a manner described above. The procedure is then ended in step 545.

If in step 530 it is found that there is a problem in the running of the application, then step 555 is entered, in which the counter i is incremented. Step 560 is then entered, in which it is checked whether the counter i is greater than a predetermined number A. If not, step 515 is re-entered, in which the application is re-started, and the procedure is continued in step 520 as described above. However, if in step 560 it is found that the counter i has a value larger than the predetermined number A, i.e. the application has had to be re-started a predetermined number of times, then step 550 is entered, in which rollback to the previous file is performed as described above. Step 545 is then entered, in which the procedure is ended.

According to the invention, upgrading of files can either be performed so that all files in file system 300 are upgraded at the same time, or, alternatively, only some of the files in file system 300 are upgraded at the same occasion. In some instances, such as when the file(s) to be upgraded are of particular importance for the operation of radio base station 115, the upgrading of files may be performed a little at a time, so that not all the crucial information would be lost should the updating of files for some reason not be successful.

The inventive upgrading procedure of FIG. 5 can obviously be changed in many ways. In one embodiment of the upgrading procedure, no counter i is used to count how many times an application affected by the upgrading is re-started, but the rollback of step 550 is performed upon the first indication that a new file, loaded in step 500, causes problems. Obviously, step 520 could be part of step 530, so that, if the application has not started, it is detected in step 530 that the application is not running smoothly. Step 505, in which the re-start file 320 is updated with the information on how to locate the new version of the file-to-be updated, can be replaced by the following method: saving the version previously used as the version to be used in the operation of the radio base station 115 under a name indicating that this is the file that should be used in the roll-back procedure, and saving the new version under the previous name of the version previously used, this name indicating that this is the version to be used in the operation of the radio base station 115. In doing so, the re-start file 320 does not have to be altered, but the files found at the addresses to which the pointers/paths of re-start file 320 are pointing have been altered. Step 550 could then include swapping the names of the active version and version to be used in the rollback procedure. Alternatively, the file name of the previous version could be stored in the new version of the file, so that the files of file system 300 of which a rollback version exists comprise the path to this rollback version.

In some instances, it might be desirable to add new files to file system 300. If new files are added to file system 300 in the upgrading procedure illustrated by FIG. 5, then the file information file 315 (cf. FIG. 3) could preferably be updated before the re-start of step 507 is performed.

The inventive upgrading procedure illustrated in FIG. 5 has many advantages. If, for example, the upgrading of files is for some reason unsuccessful, rollback to a previous version of the upgraded files can be performed. If the upgrading of files has caused some major error in the file system 300, a copy of the entire previous file system 300 can be retrieved from the back-up area 305. Furthermore, the inventive upgrading procedure facilitates for the simultaneous upgrading of data files 252 and 254 and programme files 253, since the re-start file 320 can simultaneously hold information regarding the versions to be used of both data files and programme files. This is particularly advantageous when a new application programme file requires a new data file for its execution. Hence, configuration specific data files can be upgraded regardless of whether the upgraded data is compatible with the present application programme files, and vice versa, since both configuration specific data file(s) and application programme files can be upgraded simultaneously. Similarly, product specific data files can be upgraded regardless of whether the upgraded data is compatible with the present application programmes, and vice versa. In fact, all files of file system 300 could, if desired, be upgraded at the same time. Should the upgrading for some reason be unsuccessful, a simultaneous rollback to previous versions can be made for both programme file(s) 253 and data file(s) 252/254.

Compatibility Between Different Versions of Platform Part 215 and Application Part 220

Communication between the application part 220 and the platform part 215 in FIG. 2 is preferably performed over an internal interface 260. Application part 220 preferably acts as a client to the platform part 215. Platform 215 then acts as a server to application part 220. The properties of internal interface 260 are determined by the properties of the platform part 215. When platform part 215 is upgraded, a more advanced version of internal interface 260 may become available in radio base station 115. Upgrading of platform part 215 may e.g. be performed as a replacement of hardware or platform software components on an already existing radio base station 215, or as part of the development process of the production of new radio base stations 215. Since there may be reasons for not wanting to update the application part 220 in accordance with the upgrading of the platform part 215, it is important to assure compatibility of the upgraded version of platform 215 with versions of application part 220 which are executable on previous versions of platform part 215. The reasons for not wanting to upgrade the application part 220 may vary, and could e.g. be that an operator of radio base station 115 does not want to take the risk of bugs and/or financial commitment involved in updating to a new version of application part 220, that the operator of mobile radio network 100 wants to use the same application part 220 on all radio base stations 115 in mobile radio network 100, or that the manufacturer of radio base stations 115 wants to introduce changes to the platform part 215 of newly manufactured radio base stations 115 without having to involve the operator of mobile radio network 100.

Similarly, when the application part 220 of radio base station 115 is upgraded, it is important that the upgraded application part 220 is compatible with already existing versions of platform part 215.

In order to assure such compatibility between an upgraded version of platform 215 comprising a new version of the internal interface 260 and versions of application part 220 which are executable on previous versions of platform part 215, an upgraded version of platform part 215 should preferably support previous versions of internal interface 260, as well as the new, more advanced, version. Similarly, a new version of the application part 220, being executable on the latest version of internal interface 260, should preferably be executable on a platform part comprising earlier versions of the internal interface 260. Each version of the internal interface 260 could preferably be given an identification, such as a number or a letter combination.

In some instances, one or several existing versions of internal interface 260 may be less attractive to use in the communication between application part 220 and platform part 215 of a radio base station 115: the functionalities provided by a specific version of internal interface 260 may e.g. cause problems to the operation of radio base station 115. In order to avoid the usage of such problematic versions of internal interface 260, platform part 215 can preferably comprise a list of supported versions of internal interface 215. An example of such a list 600 of platform supported interface versions is given in FIG. 6a. In list 600 of platform supported interface versions of FIG. 6a, it is indicated that platform part 215 supports versions 9, 8, 6, 5 and 2 of internal interface 260, where a higher number indicates a later version of the internal interface 260. (List 600 is a typical example of a product specific data file, as discussed in relation to FIG. 3).

In application part 220, preferably in data files 254, a corresponding list of which versions of internal interface 260 are supported by application part 220 is advantageously stored. An example of such a list 605 of application supported interface versions is shown in FIG. 6b. In the list 605 of application supported interface versions shown in FIG. 6b it is indicated that the application part 220 supports versions 7, 4, 3, 2 and 1 of internal interface 260. Hence, both list 600 and list 605 of the example given in FIGS. 6a and 6b contains "holes", i.e. there are versions of internal interface 260 which are older than the latest supported version but which are not supported by platform part 215 and application part 220, respectively.

Figure 6C:
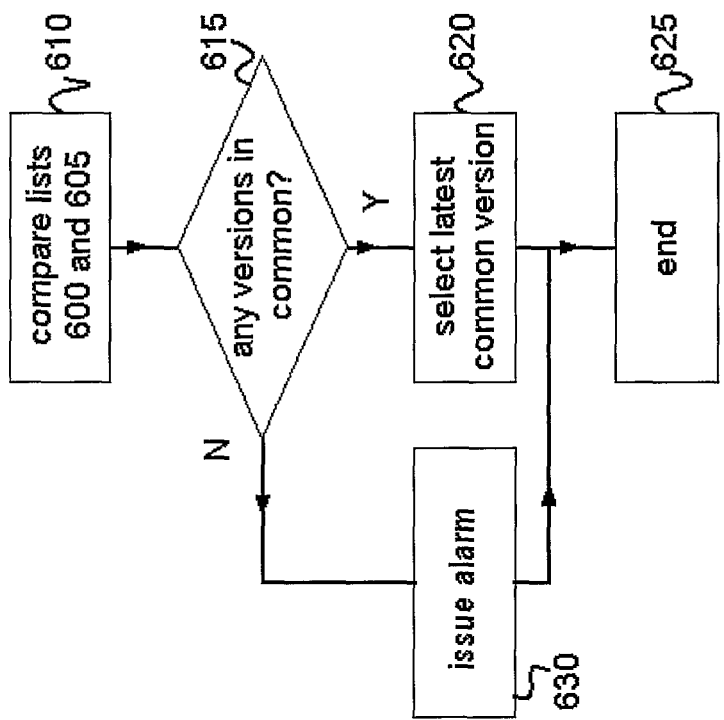
FIG. 6 is a schematic illustration of an embodiment of an inventive method of assuring that there is a version of an internal interface that is supported by both the platform part and the application part of a radio base station.
Figure 6B:
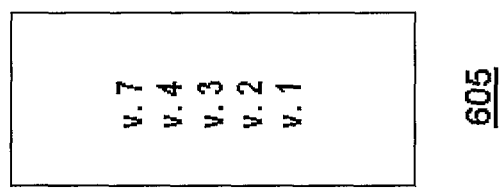

FIG. 6c schematically illustrates the procedure of finding a version of internal interface 260 which is compatible with both the platform part 215 and the application part 220 of radio base station 115. This procedure is advantageously performed by the application part 220 upon start-up of the radio base station 115, or could alternatively be performed by the executable files 251 of platform software 255 of platform part 215. In step 610, the contents of lists 600 and 605 are compared, in order to identify any versions of internal interface 260 which occur in both list 600 and list 605. Then step 615 is entered, in which it is checked whether the conversion in step 610 could identify any version(s) of internal interface 260 that occurs in both list 600 and list 605. If in step 615 it is found that there is at least one version of internal interface 260 that is included in both list 600 and 605, step 620 is entered, in which the latest of the versions of internal interface 260 that are included in both lists 600 and 605 is selected as the version of internal interface 260 according to which the radio base station 115 is going to operate. The procedure is then ended in step 620. However, if in step 615 it is found that there is no version of internal interface 260 that is included in both list 600 and 605, then step 630 is entered, in which an alarm is issued. When the procedure of FIG. 6c is invoked due to upgrading of files in platform software 255 or in the application part 220, then step 630 could preferably include reverting to a previous version of the platform software 255/application part 220, as described in detail in relation to FIG. 5. In another embodiment, step 630 could include re-start of the radio base station according to a start-up procedure, of which an example is given in FIG. 4. Obviously, the version selected in step 620 does not have to be the latest version that is included in both list 600 and 605, but could be any version included in both lists.

Figure 6A:
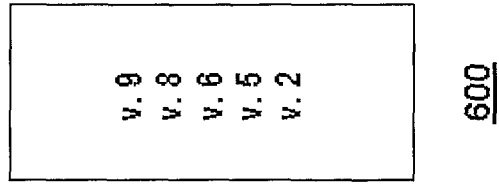

If the procedure of FIG. 6c had been executed in a radio base station 115 comprising the lists 600 and 605 of FIGS. 6a and 6b, respectively, then version 2 of internal interface 260 would have been selected in step 620. Needless to say, a version of an internal interface 260 could be denoted in any manner, and does not have to be denoted in the way used in the example of FIG. 6.

The procedure illustrated by FIG. 6c can advantageously be automatically performed by the application part 220 upon start-up of the radio base station 115. Alternatively, the procedure illustrated by FIG. 6c can be performed by an O&M node 135 upon upgrading of the application part 220 and/or platform software 255 of radio base station 115 (cf. FIG. 5). In doing so, the O&M node 135 may have to send a query to the radio base station 115 regarding versions of internal interface 260 supported by the part of radio base station 115 which is not to be upgraded. The O&M node can then compare the reply to the query with the versions of internal interface 260 supported by the new version of application part 220/platform software 255. If there is a version of internal interface 260 that is supported by both the new version of application part 220/platform software 255 and the part of radio base station 115 which is not to be upgraded, then the new version of application part 220/platform software 255 is loaded into the radio base station 115. The O&M node 135 can then advantageously instruct the radio base station 115 as to which version of internal interface 260 should be used for the communication between the platform part 215 and the application part 220. If no version of internal interface 260 can be found that is supported by the new version of the application part 220/platform software 255 to be upgraded and the part of radio base station 115 which is not to be upgraded, then an alarm is advantageously issued.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A radio base station for transmitting and receiving radio signals in a mobile radio network, the radio base station having an interface with a remote operation and maintenance node, the radio base station comprising:
   a radio interface that provides mobile communications to end user mobile electronic devices;
   a non-volatile memory comprising a file system in which files relating to operation of the radio base station are stored; wherein
      the file system comprises at least two versions of an operational file, out of which one version is an active version used in the operation of the radio base station and received from the remote operation and maintenance node as an upgrade version of the operational file and out of which one version is a previous version;
      the radio base station comprises an indication as to which of said at least two versions is the active version;
      the radio base station operates using the upgrade version of the operational file as the active version of the operational file;
      the radio base station (i) determines that its operation using the upgrade version of the operational file is running smoothly and (ii) detects that the radio base station is not able to contact the remote operation and maintenance node;
      the radio base station reverts to using the previous version of the operational file in the operation of the radio base station instead of the upgrade version of the operational file after (i) determining that the operation of the radio base station using a new version of the file-to-be-upgraded is running smoothly and (ii) detecting that the radio base station is not able to contact the remote operation and maintenance node;
   the radio base station further comprises a content indicator for a file stored in the file system, the content indicator indicating whether or not the file associated with the content indicator is faulty;
   a boot application is arranged to check said content indicator upon start up of the radio base station; and
   the boot application is further arranged to load contents of a backup area into the file system if the content indicator indicates that the file is faulty.

2. The radio base station of claim 1, wherein
the non volatile memory stores are start file comprising said indication, said indication comprising information regarding where in the file system the active version of the operational file is stored; and wherein
the radio base station is arranged to update the re start file comprising said indication when a new active version of the operational file is included in said file system by way of an update operation.

3. The radio base station of claim 1, wherein the non volatile memory stores are start file comprising said indication, said indication comprising information regarding where in the file system the active version of the operational file is stored; and wherein
the radio base station is arranged to, upon updating of said operational file, store a version of the operational file that previously was the active version as a version which should be used upon reverting to a previous version, and said radio base station is further arranged to store an updated version of the operational file as a new active version of the operational file so that said indication in the re start file indicates that said new active version is a version to be used in the operation of the radio base station.

4. The radio base station according to claim 1, wherein data relating to a specific information category is stored, in the file system, in a data file of a file type for data relating to said specific information category; and
the radio base station comprises software for upgrading the data file in the file system comprising computer program code for checking whether a new version of the data file to be upgraded is of the same file type as a version of the data file to be upgraded that is stored in the file system prior to the upgrading.

5. The radio base station according to claim 1, wherein the non-volatile memory comprises the backup area for back up storage of files of the file system, wherein the backup area is independent of the file system.

6. The radio base station of claim 5, wherein
the radio base station further comprises the boot application;
the file system comprises an information file comprising information regarding files that should be present in the file system;
the boot application is arranged to read contents of the information file and compare said information to files that are actually present in the file system; and wherein
the boot application is further arranged to load the contents of the backup area into the file system if discrepancies are detected between the files that should be present and the files that actually are present in the file system.

7. The radio base station of claim 1, wherein the radio base station comprises a platform part, an application part and plural versions of an internal interface, the platform part and the application part interacting via one of the versions of the internal interface;
the platform part comprises a first data file comprising first information identifying versions of said internal interface that are supported by the platform part; and
the application part comprises a second data file comprising second information identifying versions of said internal interface that are supported by the application part.

8. The radio base station of claim 7, wherein
the radio base station is arranged to compare, upon upgrading of one of the platform part or the application part with a new version of the platform part or the application part, the data file for the part of the radio base station that is not being upgraded with an updated version of the data file for the new version of the part of the radio base station which is being upgraded; and
the radio base station is further arranged to select, for use in the operation of the radio base station, a version of the internal interface which is supported by both the new version of the part of the radio base station that is upgraded and the part of the radio base station that is not upgraded.

9. A radio base station for transmitting and receiving radio signals in a mobile radio network, the radio base station having an interface with a remote operation and maintenance node, the radio base station comprising:
a radio interface that provides mobile communications to end user mobile electronic devices;
a hardware-based platform part, a software-based application part, and plural versions of an internal interface, the platform part and the application part interacting via one of the versions of the internal interface;
the platform part comprises a first data file comprising first information identifying versions of said internal interface that are supported by the platform part;
the application part comprises a second data file comprising second information identifying versions of said internal interface that are supported by the application part;
the radio base station is arranged to compare, upon upgrading of one of the platform part or the application part with a new version of the platform part or the application part, a data file for the part of the radio base station that is not upgraded with an updated version of the data file for the new version of the part of the radio base station which is upgraded;
the radio base station is further arranged to select, based on the comparison and for use in operation of the radio base station, a version of the internal interface which is supported by both the new version of the part of the radio base station that is upgraded and the part of the radio base station that is not upgraded;
the radio base station further comprises a content indicator for a file stored in the file system, the content indicator indicating whether or not the file associated with the content indicator is faulty;
a boot application is arranged to check said content indicator upon start up of the radio base station; and
the boot application is further arranged to load contents of a backup area into the file system if the content indicator indicates that the file is faulty.

10. A method of upgrading a file to be upgraded in a radio base station having a radio interface that provides mobile communications to end user mobile electronic devices, the file-to-be-upgraded being a data file or an executable file, the radio base station having an interface with a remote operation and maintenance node, the radio base station comprising a non-volatile, writable memory comprising a file system in which the file to be upgraded is stored, the method comprising:
receiving, in the radio base station over the interface, a new version of the file to be upgraded;
storing the new version of the file to be upgraded in the file system while keeping a previous version of the file to be upgraded stored in the non-volatile, writable memory;
keeping an indication in the radio base station as to which version of the file to be upgraded is an active version of the file to be upgraded that is to be used in operation of the radio base station;

arranging the indication so that said indication indicates that the new version of the file to be upgraded is the active version;

operating the radio base station using the new version of the file-to-be-upgraded as the active version of the file-to-be-upgraded;

(i) determining that the operation of the radio base station using the new version of the file-to-be-upgraded is running smoothly and (ii) detecting that the radio base station is not able to contact the remote operation and maintenance node; and reverting to using the previous version of the file-to-be-upgraded in the operation of the radio base station instead of the new version of the file-to-be-upgraded after (i) determining that the operation of the radio base station using the new version of the file-to-be-upgraded is running smoothly and (ii) detecting that the radio base station is not able to contact the remote operation and maintenance node, wherein:

the radio base station further comprises a content indicator for a file stored in the file system, the content indicator indicating whether or not the file associated with the content indicator is faulty;

a boot application is arranged to check said content indicator upon start up of the radio base station; and the boot application is further arranged to load contents of a backup area into the file system if the content indicator indicates that the file is faulty.

11. The method of claim 10, further comprising storing are start file comprising said indication, said indication comprising information regarding where in the file system the active version of the file to be upgraded is stored; and wherein said arranging comprises updating said re start file to indicate that the new version is the active version when storing said new version.

12. The method of claim 11, further comprising modifying the re-start file, if the operation of the radio base station is disturbed when the new version of the file to be upgraded is used in the operation of the radio base station, so that the previous version of the file to be upgraded is the active version of the file to be upgraded.

13. The method of claim 10, further comprising storing are start file comprising said indication, said indication comprising information regarding where in the file system the active version of the file to be upgraded is stored; and wherein the previous version of said file to be upgraded is maintained as a version which should be used upon reverting to a previous version.

14. The method of claim 10, wherein the non-volatile, writeable memory comprises the backup area for back up storage of files in the file system, the backup area being independent of the file system, the method further comprising storing, if the operation of the radio base station is not disturbed when the new version of the file to be upgraded is used, the new version of the file to be upgraded in the back up area.

15. The method of claim 14, wherein, if the radio base station cannot operate, the contents of the backup area are copied into the file system.

16. The method of claim 10, wherein the new version of the file to be upgraded is of a specific file type; and wherein the method comprises checking whether a version of the file to be upgraded that is stored in the file system prior to the upgrading, is of the same specific file type as the new version; and if not, interrupting the upgrading of the file to be upgraded.

17. A method of operating a radio base station having a radio interface that provides mobile communications to end user mobile electronic devices, the radio base station having a hardware-based platform part, a software-based application part and plural versions of an internal interface, the platform part and the application part communicating via one of the versions of the internal interface, the radio base station further having an interface with a remote operation and maintenance node, the method comprising:

storing, in the radio base station, a first list of which versions of the internal interface are supported by the platform part;

storing, in the radio base station, a second list of which versions of the internal interface are supported by the application part;

comparing, upon upgrading of one of the platform part or the application part with a new version of the platform part or the application part, contents of the list of the part of the radio base station that is not upgraded with an updated version of the list for the new version of the part of the radio base station which is upgraded; and selecting, based on the comparison and for use in operation of the radio base station, a version of the internal interface that is supported by both the part of radio base station which is upgraded and the part of radio base station which is not upgraded, wherein:

the radio base station further comprises a content indicator for a file stored in the file system, the content indicator indicating whether or not the file associated with the content indicator is faulty;

a boot application is arranged to check said content indicator upon start up of the radio base station; and the boot application is further arranged to load contents of a backup area into the file system if the content indicator indicates that the file is faulty.

18. The method of claim 17, wherein the comparing and selecting are performed by the remote operation and maintenance node.

19. A non-transient computer readable medium comprising computer program code that, when executed on digital programmable circuitry of a radio base station having a radio interface that provides mobile communications to end user mobile electronic devices, a hardware-based platform part, a software-based application part and plural versions of an internal interface, the platform part and the application part communicating via one of the versions of the internal interface, the radio base station further having an interface with a remote operation and maintenance node:

stores, in a non-volatile memory of the radio base station, a first list of which versions of the internal interface are supported by the platform part;

stores, in a non-volatile memory of the radio base station, a second list of which versions of the internal interface are supported by the application part; and compares, upon upgrading of one of the platform part or the application part with a new version of the platform part or the application part, contents of the list of the part of the radio base station that is not upgraded with an updated version of the list for the new version of the part of the radio base station which is being upgraded; and selecting, based on the comparison and for use in operation of the radio base station, a version of the internal interface that is supported by both the part of the radio base station which is upgraded and the part of the radio base station which is not upgraded, wherein:

the radio base station further comprises a content indicator for a file stored in the file system, the content indicator indicating whether or not the file associated with the content indicator is faulty;

a boot application is arranged to check said content indicator upon start up of the radio base station; and the boot application is further arranged to load contents of a backup area into the file system if the content indicator indicates that the file is faulty.

20. A non-transient computer readable medium comprising computer program code that, when executed on digital programmable circuitry of a radio base station, upgrades a file to be upgraded in the radio base station, the file-to-be-upgraded being a data file or an executable file, wherein the radio base station has an interface with an operation and maintenance node, the radio base station including a non-volatile, writable memory storing a file system in which the file to be upgraded is stored and a radio interface that provides mobile communications to end user mobile electronic devices, the code to carry out the upgrade includes code to:

receive, in the radio base station over the interface, a new version of the file to be upgraded;

store the new version of the file to be upgraded in the file system while keeping a previous version of the file to be upgraded stored in the non-volatile, writable memory;

keep an indication in the radio base station as to which version of the file to be upgraded is an active version of the file to be upgraded that is to be used in operation of the radio base station;

arrange the indication so that said indication indicates that the new version of the file to be upgraded is the active version;

operate the radio base station using the new version of the file-to-be-upgraded as the active version of the file-to-be-upgraded;

(i) determine that the operation of the radio base station using the new version of the file-to-be-upgraded is running smoothly and (ii) detect that the radio base station is not able to contact the remote operation and maintenance node; and revert to using the previous version of the file-to-be-upgraded in the operation of the radio base station instead of the new version of the file-to-be-upgraded after (i) determining that the operation of the radio base station using the new version of the file-to-be-upgraded is running smoothly and (ii) detecting that the radio base station is not able to contact the remote operation and maintenance node, wherein:

the radio base station further comprises a content indicator for a file stored in the file system, the content indicator indicating whether or not the file associated with the content indicator is faulty;

a boot application is arranged to check said content indicator upon start up of the radio base station; and the boot application is further arranged to load contents of a backup area into the file system if the content indicator indicates that the file is faulty.

\* \* \* \* \*